3,704,285
DISPERSION POLYMERIZATION OF TETRAFLUOROETHYLENE
Verleon Henry Porter, Parkersburg, W. Va., assignor to E. I. du Pont de Nemours and Company, Wilmington, Del.
No Drawing. Continuation-in-part of application Ser. No. 812,294, Apr. 1, 1969. This application July 19, 1971, Ser. No. 163,877
Int. Cl. C08f 1/13, 3/24, 15/06
U.S. Cl. 260—87.5 A                               15 Claims

ABSTRACT OF THE DISCLOSURE

A polymerization process for preparing an aqueous dispersion of polytetrafluoroethylene resins involving using both a hydrocarbon-based surfactant and a fluorocarbon-based surfactant as nucleators for polymerization followed by subsequent injection of chlorendic acid as stabilizer as the polymerization proceeds to normal final solids content. The resultant dispersion upon coagulation and drying yields products capable of being paste-extruded into tapes, etc., of a higher tensile strength for a given reduction ratio and extrusion pressure than previously attainable directly.

RELATED APPLICATION

This application is a continuation-in-part of my application Ser. No. 812,294, filed Apr. 1, 1969, now abandoned.

BACKGROUND OF THE INVENTION

Polytetrafluoroethylene can generally be divided into two distinct categories often referred to as "granular" and "dispersion" forms of this polymer. The former of these is disclosed in patents such as U.S. Pat. No. 2,393,967 issued to M. M. Brubaker and is further defined in U.S. Pat. No. 2,936,301 issued to P. E. Thomas and C. C. Wallace, Jr., while the latter is disclosed in patents such as U.S. Pat. No. 2,559,750 issued to K. L. Berry and U.S. Pat. No. 3,142,665 issued to Cardinal et al. The granular resin is produced in slurry form in an essentially inert polymerization medium, usually water, whereas the dispersion form is in essence a stable suspension of particles of colloidal size in a similar medium. The successful production of the dispersion polymer requires the presence of a so-called dispersing agent or soap-like stabilizer, in order to avoid coagulation.

The "dispersion" resin is uniquely distinguished from the "granular" powder not only in its state of subdivision, but also in its fabricability. Used directly while still suspended in the polymerization medium, it may be fabricated into useful articles by many of the well-known techniques by which latexes and colloidal suspensions are handled, such as dip-coating, film-casting, etc. The "dispersion" resin can also be coagulated, dried, and paste-extruded into products such as tapes, wire coatings, tubing, beading, etc. These products may then either be used as is, for instance, in the case of tapes for pipe thread joints, or, optionally, may be calendered and sintered for uses where higher tensile strength is required.

The products of this invention, when fabricated into tape, permit, for a given level of extrusion pressure, tape of higher tensile strength to be achieved in a standardized fabrication procedure than was heretofore attainable. Conversely, for a given tape tensile strength, the products can be extruded at lower extrusion pressures (and/or higher extrusion rates). Furthermore, the elongations of tapes prepared from the products of this invention are higher, relative to those heretofore achievable, as measured in the directions both along and across the tapes. A further advantage for a certain class of resins (those modified with hexafluoropropylene (HFP) during polymerization) is their improved rate of sintering in combination with the above attributes.

The utility of the products of the present invention is by no means limited strictly to tape or ribbon-like embodiments after fabrication. The products can be paste extruded into any of the conventional forms, including wire-coatings, tubing, beading, and the like. In certain instances, it is advantageous to paste extrude the polymer into tubing of large diameter and moderate wall thickness, and then to slice the tube wall longitudinally, open the form out into a flat sheet, and then to calender the sheet into a wide tape which may be further slit if desired.

In the past, polytetrafluoroethylene dispersions usually have been produced by adding to a pressure reactor a dispersing agent, paraffin wax, water, and a catalyst generally of the free-radical type. The reactor is then pressured up with tetrafluoroethylene gas, the pressure being maintained as polymerization proceeds until the desired solids level is achieved, at which time the reaction is shut down. An improvement on this process involves the split or continuous addition of dispersing agent to modify the product dispersion in any of several ways. This improvement is described in U.S. Pat. No. 3,391,099 issued July 2, 1968, to John Oliver Punderson. The polymerization of perhalogenated monomers to form aqueous polymer dispersions using chlorendic acid as the dispersing agent is described in U.S. Pat. No. 2,816,082 issued Dec. 10, 1957, to Keith Clark Brinker and Robert Macdonald Ross.

SUMMARY OF THE INVENTION

The present invention relates to the production of polytetrafluoroethylene dispersions which upon coagulation require relatively low pressure upon paste extrusion and yet exhibit retention of high tensile strength in the tape produced.

In accordance with the present invention, a combination of both hydrocarbon- and fluorocarbon-type surfactants is used as nucleators for polymerization, followed by subsequent injection of chlorendic acid as stabilizer as the polymerization proceeds to normal final solids content. Any conventional pressure reactor for producing polytetrafluoroethylene resin dispersions, such as an autoclave or other heavy-walled vessel, may be used in preparing the polytetrafluoroethylene resin dispersions of the present invention. Preferably, the reactor is stirred or agitated. Generally, the reactor is initially charged with from 30 to 80 percent of its volume of water, and with up to 1.0 weight percent, as based on the water charge, of a conventional tetrafluoroethylene polymerization initiator. Such polymerization initiators generally are water-soluble, inorganic or organic compounds containing one or more peroxy groups per molecule. The reactor is then pressured at from 50 to 700 p.s.i.g. with tetrafluoroethylene gas. The beginning of polymerization is indicated by a drop in pressure (usually of 3 percent below its full initial value) and generally occurs within a few minutes after the reactor has been pressured up with tetrafluoroethylene, and preferably occurs within 30 minutes after pressuring. The early portion of the polymerization run involves principally nucleation, and the present invention involves the use of both hydrocarbon- and fluorocarbon-type dispersing agents during this nucleation stage, followed by the use of chlorendic acid as a dispersing agent during the growth-of-particles stage. The transition from the nucleation to the growth stage occurs smoothly between about the 4 and 10 percent solids levels, as based on the total dispersion, in the dispersion polymerization of tetrafluoroethylene. Thus, the hydrocarbon- and fluorocarbon-type dispersing agents should substantially all be added prior to the formation of 4 percent solids in the dispersion, while the start of addition of chlorendic acid stabilizing agent to the dispersion medium should occur after 4 percent solids have been formed, but preferably before 10 percent solids have been formed.

The hydrocarbon-based nucleating agents generally are non-ionic and are made up principally of hydrogen, carbon and oxygen. However, various organophosphate and organosilicone dispersing agents are suitable for use as nucleating agents in the present process. The preferred hydrocarbon-based nucleating agents have the formula R$(C_6H_4)_k(OCH_2CH_2)_xOH$ where R is a primary, secondary, or tertiary alkyl group of from 1 to 20 carbon atoms, $C_6H_4$ is a phenylene group, $k$ is 0 or 1, and $x$ is an integer of from 4 to 50. Tertiary octyl and nonyl are especially preferred "R" species when $k=1$. Generally, from 0.00002 to 0.002 percent by weight as based on the water present, of hydrocarbon-based dispersing agent is used. The hydrocarbon-based nucleating agent should, at the concentration of 1 percent by weight in aqueous medium (or in a saturated solution if the solubility is less than 1 percent by weight) have the ability to reduce surface tension by at least 30 dynes/centimeter as measured at 23° C. by the well-established platinum ring method.

The fluorocarbon-based dispersing agents generally are ionic and are salts of an alkali metal, ammonia or a lower-alkyl substituted ammonia with a carboxylic acid or sulfonic acid which have a perfluorinated alkyl or perfluorinated alkyl ether hydrophobic portion. If desired, the hydrophobic portion may have a hydrogen or a chlorine atom covalently attached to the terminal carbon atom away from the hydrophilic portion of the compound.

Preferred fluorocarbon nucleating agents have the formula (1)            Y—R$_f$—Z—M Y is selected from the class consisting of hydrogen, chlorine and fluorine;
R$_f$ is branched or unbranched and is —C$_n$F$_{2n}$—, wherein $n$ is an integer of from 5 to 10;
Z is selected from the class consisting of

M is selected from the class consisting of alkali metals, the ammonia ion and lower-alkyl-substituted ammonium ions; or (2)

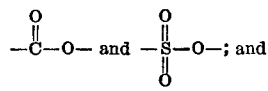

wherein

R$_f'$ is a perfluoroalkyl group of from 1 to 5 carbon atoms;
R$_f''$ is selected from the class consisting of fluorine and perfluoromethyl;
$m$ is an integer of from 0 to 10; and
M and Z have the meanings defined above.

Generally, from 0.001 to 0.2 percent by weight as based on the water present of fluorocarbon-based dispersing agent is used. The fluorocarbon-based dispersing agent should at the concentration of 1 percent by weight in aqueous medium (or in a saturated solution if the solubility is less than 1 percent) have the ability to reduce surface tension by at least 20 dynes/centimeter as measured at 23° C., again by the platinum ring method.

Preferably, from 0.0001 to 0.001 percent by weight as based on the water present of hydrocarbon-based dispersing agent is used and from 0.0025 to 0.15 percent by weight as based on the water present of fluorocarbon-based dispersing agent.

In the present process chlorendic acid [1,4,5,6,7,7-hexachlorobicyclo(2.2.1)-5-heptene - 2,3 - dicarboxylic acid] is used as the stabilizing agent. Normally, this stabilizing agent is added in an amount of from 0.4 to 2.5 percent by weight, based on the water present. Addition of this stabilizer is begun after 4 percent by weight, but before 10 percent by weight solids, as based on the total dispersion, have been formed. The addition of the total quantity of chlorendic acid to be used can be made in its entirety over a relatively brief interval, or can be spread out over part(s) or all of the remaining portion of the run, so long as the ratio of chlorendic acid to polymer present at any time does not fall so low as to allow substantial coagulation of the dispersed solids to ensue.

The reaction medium normally is maintained at from 50 to 125° C. Due to economic considerations, the reaction normally is carried out until at least 20 percent by weight, as based on the total dispersion, of solids have been formed. Usually, the reaction is shut down before 50 percent by weight, as based on the total dispersion, of solids have been formed, in order to prevent excessive coagulum formation. Ordinarily the reaction takes from 20 to 240 minutes from kickoff to shutdown. The average particle size in the final dispersion generally is from 0.12 to 0.35 micron.

This invention applies mainly to polytetrafluoroethylene homopolymer and to tetrafluoroethylene copolymers containing at least 98 percent by weight and preferably 99 percent by weight combined tetrafluoroethylene. The approximate amount of combined comonomer with tetrafluoroethylene can be determined by infra-red measurement. Substances suitable to be copolymerizd with tetrafluoroethylene herein include various halogenated ethylenes, particularly perhalogenated ethylenes, halogenated propylenes, particularly perhalogenated propylenes, and halogenated vinyl ethers, particularly perhalogenated methyl, ethyl, and propyl vinyl ethers.

Preferred comonomer because of improved rate of sintering is hexafluoropropylene. Sufficient comonomer is added to the polymerizate so that the final product has up to about 1 percent combined weight percent of the comonomer and preferably 0.01 to 0.3 weight percent as determined by infra-red measurement.

DESCRIPTION OF THE PREFERRED EMBODIMENTS

From the description given above, it may be seen that very low concentrations of dispersing agent are sufficient to provide a measurable nucleating effect. To provide a true measure of such effect, it is necessary that the polymerization vessel be scrupulously clean and free of dispersing agent at the start of each test. This condition was accomplished in all of the following examples by careful rinsing and steaming procedures.

EXAMPLE 1

A horizontally disposed, water/steam jacketed, cylindrical stainless-steel autoclave located in a barricade and having a capacity of 36,250 cc. and a length-to-diameter ratio of about 1.5 to 1, and provided with a 4-bladed cage-type agitator capable of being rotated at 50 r.p.m. and running the length of the autoclave, is evacuated, and then charged with 725 grams of paraffin wax and 16.3 kg. of demineralized water, which is then heated to 72° C., after which 5.0 grams of ammonium perfluorocaprylate (C–8 APFC), a perfluorinated dispersing agent, 8.2 grams disuccinic acid peroxide initiator, and 0.0545 gram "Triton" X–100, a commercially available surfactant having the formula

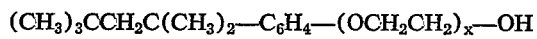

wherein $x$ has an average value of between 9 and 10, are added. All concentrations are based on the weight of the initial water charge. The charge is then heated to the desired reaction temperature of 90° C. with stirring and pressured over a period of about 2 minutes to 26.8 atmospheres absolute (380 p.s.i.g.) with tetrafluoroethylene when the desired reaction temperature is reached. Stirring rate and temperature are then maintained until kickoff occurs as evidenced by a 10 p.s.i. (0.68 atm.) drop in pressure, and the time from the start of the pressure-up to the kickoff is recorded. Additional tetrafluoroethylene is then added to raise the reaction pressure to 28.2 atmospheres absolute (400 p.s.i.g.) and to maintain the reaction pressure constant until a dispersion of approximately 35 percent solids content (total polymer plus water basis) is obtained. After 910 grams of tetrafluoroethylene has been fed after kickoff (5.3 percent solids formed), 960 grams of a 16.7 percent by weight, hot (90° C.) aqueous solution of chlorendic acid is injected into the autoclave to stabilize the dispersion, and the content of the injection lines are flushed into the autoclave using 500 grams of demineralized water. After 9500 grams of tetrafluoroethylene has been fed after kickoff, the monomer feed to the autoclave is terminated, and the pressure is allowed to decrease to 175 p.s.i.g. (12.9 atm. absolute) before agitation is stopped and the vapor space of the reactor is vented. The resulting dispersion is discharged and cooled, after which the supernatant of solid wax is removed, and the dispersion is diluted, brought to a pH of 8 to 9 by addition of ammonium hydroxide, and coagulated by the procedure of J. F. Lontz, U.S. Pat. 2,593,583, issued Apr. 22, 1952. Samples of the dry powder are lubricated, extruded, and calendered into tape to determine the extrusion pressure and resultant tape properties of tensile strength and ultimate elongation as described elsewhere.

In similar runs in which the following nucleator combinations were used, processing characteristics were similar to those described above, and the products when fabricated into tape by the standardized procedure were essentially equivalent to the product described above.

1(a) Five grams C-9 AFC (ammonium ω-hydrohexadecafluorononanoate) plus 0.0545 gram "Triton" X-100;

1(b) Two grams C-8 APFC (ammonium perfluorocaprylate) plus 0.091 gram Surfactant DN-65 (a "modified ethoxylated straight-chain alcohol" sold commercially by the Rohm and Haas Company of Philadelphia, Pa., as a proprietary product). It has a "cloud point" of about 65° C. in an aqueous medium and is believed to have the formula:

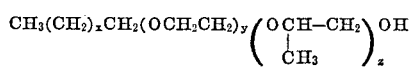

wherein $x \cong 10$
$y \cong 12$ average values ±1.
$Z \cong 5$

1(c) Five grams C-8 APFC plus 0.0182 gram "Tergitol" NP-27 ($C_9H_{19}-C_6H_4O(CH_2CH_2)_x$ wherein $x \cong 7$ 1(d) Five grams $C_8F_{17}SO_3K$ plus 0.0545 gram "Triton" X-100.

EXAMPLE 2

Example 1 is repeated, except that the chlorendic acid solution is injected after 1820 grams of tetrafluoroethylene has been fed after kickoff (10 percent solids formed). The resultant product is found to be similar to the product of Example 1.

EXAMPLE 3

Example 1 is repeated, except that the disuccinic acid peroxide initiator concentration is increased by 25 percent. The product obtained is similar to those of Examples 1 and 2 when evaluated as tape.

EXAMPLE 4

Example 1 is repeated except that the disuccinic acid peroxide initiator concentration is increased by 50 percent. The product obtained is similar to those of Examples 1 and 2 when evaluated as tape.

EXAMPLE 5

Example 1 is repeated, except that 0.044 gram of reduced iron powder is also charged to the autoclave as a promoter for the initiator. The overall polymerization rate is improved, and the product obtained is similar to that of Example 1.

EXAMPLE 6 (comparison)

Example 5 is repeated, except that the "Triton" X-100 is omitted from the recipe. The product obtained gives tape inferior to that of Example 5.

EXAMPLE 7 (comparison)

Example III of U.S. Pat. 3,391,099, involving use of a fluorocarbon-based nucleator (but not a hydrocarbon-based nucleator simultaneously) followed by use of chlorendic acid as stabilizer, as repeated, but on a five-fold larger scale. The product obtained gives tape inferior to that of Examples 1 through 5.

EXAMPLE 8(a) (comparison)

Example 1 is repeated, except that ammonium perfluorocaprylate surfactant is omitted from the recipe (similar in principle to Example 6); no dispersion is obtained, since excess coagulum forms before the injection of the chlorendic acid.

EXAMPLE 8(b) (comparison)

Example 1 is repeated, except that a 2.35 weight percent solution of ammonium perfluorocaprylate replaces the chlorendic acid solution. The total ammonium perfluorocaprylate concentration in the dispersion is brought to 0.138 percent based on the total water. The product produced is inferior to that of Example 1 when fabricated into tape by the standardized procedure, and has properties typical of those of homopolymer resins of the prior art.

EXAMPLE 9

The procedures of Example 1 are repeated in that into the same autoclave are charged 855 grams paraffin wax, 20.7 kg. of demineralized water, 6.67 grams of ammonium perfluorocaprylate, 11.1 grams of disuccinic acid peroxide, and 0.0728 gram of "Triton" X-100. The polymerization proceeds as described in Example 1, except that 1200 grams of 16.7 weight percent, aqueous solution of chlorendic acid is injected into the autoclave after 1135 grams of tetrafluoroethylene is fed after kickoff (5.2 percent solids formed). Additional tetrafluoroethylene is then added to maintain the reaction pressure constant at 400 p.s.i.g. (28.2 atm. absolute) until a dispersion of approximately 37 percent solids content is obtained. Termination of polymerization is carried out as per the procedure of Example 1. The final product yields tape which is similar in tensile strength and elongation to the product of Example 1.

The properties of tapes made from the polytetrafluoroethylene produced by Examples 1-9 are reported in Table I along with the space-time yield. Included in Table I are corresponding properties of control samples, representing a range of TFE homopolymer resins typical of the prior art.

Standard Specific Gravities (SSG) of the products described in the examples were measured by the procedure described in U.S. 3,142,665, except that 12-gram, instead of 3.5-gram, chips of the same diameter were employed.

The average dispersion particle diameters were measured by the procedure described in U.S. 3,391,099. For TFE homopolymer dispersions containing 0.9 percent chlorendic acid (based on water present) when removed from the autoclave, a refractive index increment of 0.019 cc./gram was used, while for HFP-modified dispersions containing about 0.12 weight percent of combined HFP in the polymer and a similar level of chlorendic acid to that above in the raw dispersion, a refractive index increment of 0.017 cc./gram was employed.

Paste extrusion and calendering of all samples reported herein were carried out according to the standardized procedures described below:

Paste extrusion

The resin obtained by coagulation of the dispersion by mechanical agitation was dried in an air oven for 16 hours at a temperature of 150° C. Two hundred grams of the dry resin was placed in a cylindrical glass jar about 3⅝ inches in diameter and blended with 47.6 grams of "Varsol," a commercially available kerosene-type hydrocarbon lubricant having a relatively low volatility at room temperature. The jar and contents were rolled for 20 minutes at 30 r.p.m. to effect blending, and then placed in a water bath maintained at 30° C. for 2 hours for conditioning. The lubricated resin was then pressed at about 50 p.s.i.g. pressure into a preform of 1⅛ inch diameter. The preform was placed into the vertically disposed cylinder of a paste extruder, the cylinder being of 1¼ inch diameter. The extruder end had a smooth matching surface with the inner cylinder surface having an angle of 165° incident to the cylinder and leading to an orifice having a uniform diameter of 0.125 inch and a land length of 1.025 inch. Water from a thermostatted bath maintained at 30° C. was circulated around the cylinder and die to hold the extrusion temperature constant. A ram was advanced into the upper, larger end of the cylinder at such a rate as to extrude $19.0 \pm 1.0$ grams of polymer (lubricant-free basis) per minute. The pressure developed in the ram face in contact with the sample was recorded as a function of time. The average steady-state pressure required to extrude the sample during the entire fourth minute, as measured from the time of first emergence of extrudate from the die, was determined. The extrudate produced during the fourth minute of extrusion was collected in a jar containing a small quantity of "Varsol" and the jar was promptly capped. The end of the length of extrudate which emerged first during the fourth minute of extrusion was flattened slightly to distinguish it from the end which emerged last.

The calender used in these tests consisted of two parallel, cylindrical, rolls of stainless steel bearing a high polish. The long axes of the rolls were horizontal, with one roll placed above the other. The rolls were cored so that heated water could be pumped through them to maintain a constant temperature of 30° C. Both rolls were of 3¼ inches diameter by 8 inches wide, and were motor driven at $10 \pm \frac{1}{4}$ r.p.m. through a gear assembly. The center section of the upper roll contained a rectangular notch 3 inches wide by 0.004 inch deep. The cylindrical surface of the notch had the same degree of polish as the rolls. The separation of the rolls could be precisely adjusted by hand screws at both ends, operating against spring pressure against the bearings.

An 18-inch length of the first portion of the extrudate described above was passed through the rolls, flattened end first in each case, at successive roll spacings of 0.040, 0.020 and 0.010 inch. The rolls were then brought into contact at both ends, leaving the notched gap in the center, and the ribbon was subjected to a final pass, flattened end first, through the rolls to give a tape of $0.0043 \pm 0.0002$ inch thickness. Residual lubricant was removed by dipping the tape in an acetone bath, and the product was then allowed to dry in the air. The average width of the resulting product was then measured to the nearest ¹⁄₁₆ inch with a scale. The average width was of the order of 1 inch. Tensile strengths reported herein were obtained from specimens which were cut at random points along the tape with a "dumbell"-shaped die 1 inch in length, with a central section ⅜-inch wide by ½-inch long. Five specimens were cut with their long axes parallel to the length of the tape, and five others with their long axes directly across the tape. The thickness of each specimen was measured to 0.0001 inch with a dial-gauge micrometer. The specimens were stretched in a standard Instron bench-model tensile tester at $22 \pm 1°$ C, at a rate of 2 inches per minute. The ultimate tensile strength and ultimate elongation were recorded, and the separate results averaged.

The tensile performance of tape in the transverse direction, while of less importance than that in the longitudinal direction, is not without significance. Improvements in properties, over the products of the prior art, especially in elongation, are desirable in minimizing the tendency for cracking or splitting of the tape when used as a sealant or while being wrapped on wire. Transverse elongation of tapes produced from the resins of this invention were consistently higher than those of control resins of the prior art.

The degree to which the edges of tapes calendered from the products of the present invention were straight and parallel, ranged from equivalent to, to better than, that of tapes made from resins of the prior art. The degree was noticeably improved in the case of hexafluoropropylene-modified products made using chlorendic acid as stabilizer, relative to that obtained with hexafluoropropylene modified resin made using single (initial) addition of a conventional fluorocarbon dispersing agent.

So long as the thickness of the tape after the final calendering step is small relative to any dimension of the extrudate in the paste extrusion step, the shape of the extrudate does not appear to be highly critical for an extruder having a fixed reduction ratio. Thus, comparable tape performance would be expected if a 0.250-inch x 0.049-inch rectangular ribbon were produced from the same extruder barrel instead of a 0.125-inch diameter beading in the standardized extrusion test, the cross-sectional areas of both these extrudates being equal. The thinner dimension of the rectangular ribbon here would still be more than 10-fold greater than the thickness of tape made therefrom (0.0043 inch).

As can be seen from Table I the combination of hydrocarbon-based and fluorocarbon-based nucleating agents produces a polytetrafluoroethylene dispersion which produces higher tensile strength tapes as related to the extrusion pressure used, than when a fluorocarbon-based nucleating agent alone is used.

The following examples illustrate that the teachings of the present invention are also applicable to the dispersion polymerization of tetrafluoroethylene in the presence of hexafluoropropylene as modifier.

EXAMPLE 10

Example 9 is repeated, except that 37.5 grams of hexafluoropropylene are charged as a comonomer to the autoclave just before heating the autoclave charge from 72° C. to reaction temperature and pressuring-up with tetrafluoroethylene. IR analysis shows 0.12 approximate weight percent combined HFP in the product. The product obtained is processed into tape of improved tensile properties when compared to HFP-modified resin of the prior art.

EXAMPLE 11

Example 10 is repeated, except that 22.5 grams of hexafluoropropylene are charged to the autoclave. IR analysis shows 0.093 approximate weight percent combined HFP in the product. The product, which has a 25 percent lower combined hexafluoropropylene content that that of Example 10, gives tape equivalent to that of Example 10.

EXAMPLE 12

Example 10 is repeated, except that 0.0273 gram of "Triton" X-100 is used instead of 0.0728 gram. The product gives tape equivalent to that of the product of Example 10.

EXAMPLE 13 (comparison)

Example 10 is repeated, except that "Triton" X-100 is omitted from the recipe. The product obtained is inferior to that of Examples 10, 11 and 12 when evaluated as tape.

EXAMPLE 14

Example 9 is repeated in that into the same autoclave are charged 855 grams paraffin wax, 20.7 kg. of demineralized water, 6.67 grams of ammonium perfluorocaprylate, 10.5 grams of disuccinic acid peroxide, 0.0684 gram of "Triton" X-100, and 24.0 grams of hexafluoropropylene comonomer. However, in this case 1200 grams of a 16.7 weight percent, hot aqueous solution of chlorendic acid is injected into the autoclave after 1135 grams of tetrafluoroethylene is fed after kickoff. Additional tetrafluoroethylene is then added to maintain the reaction pressure at 400 p.s.i.g. (28.2 atm. absolute) until a dispersion of approximately 37 percent solids is obtained. Termination of polymerization is carried out as per the procedure of Example 1. IR analysis shows 0.081 approximate weight percent combined HFP in the product. The product gives tape which is similar to that given by the products of Examples 10, 11 and 12.

EXAMPLE 15

Example 1 is repeated, except that a larger autoclave is used. To this autoclave, provided with a geometrically similar agitator capable of being rotated at 24 r.p.m., are charged demineralized water equal to 55 percent of the total empty volume of the autoclave, plus ingredients, based on the weight of the water, which consist of 4.3 percent of paraffin wax, 0.030 percent of ammonium perfluorocaprylate, 0.054 percent of disuccinic acid peroxide, 0.000325 percent of "Triton" X-100, and 0.0002 percent of reduced iron powder. The autoclave is evacuated after the contents are heated to 72° C. A charge of hexafluoropropylene equal to 0.17 percent of the weight of the water charge is then added. The contents of the autoclave are then heated to 90° C. and tetrafluoroethylene is admitted to the autoclave until a total pressure of 380 p.s.i.g. is reached (26.8 atm. absolute). After kickoff is obtained, additional tetrafluoroethylene is added to maintain a reaction pressure of between 380 and 400 p.s.i.g. (26.8 and 28.2 atm. absolute), and continued until a dispersion of approximately 37 percent solids is obtained.

After a quantity of tetrafluoroethylene equal to 6.0 percent of the aqueous charge has been added after the kickoff, a hot (100° C.), 17.0 weight percent aqueous solution of chlorendic acid is rapidly injected into the autoclave, the total weight of solution being equal to 5.55 percent of the original aqueous charge. A quantity of demineralized water equal to 2.9 percent of the aqueous charge is used to flush the contents of the injection lines into the autoclave. After the tetrafluoroethylene monomer feed to the autoclave is terminated, the pressure is allowed to decrease to 175 p.s.i.g. (12.9 atm. absolute) before the vapor space of the reactor is vented. IR analysis shows 0.087 approximate weight percent combined HFP in the product. The product when coagulated and dried is extruded and evaluated as tape and is found to be similar to the products of Examples 10, 11 and 12.

The IR analyses of combined HFP in the products of Examples 10, 11, 14 and 15 were obtained by multiplying the measured ratio of infrared absorbances at 10.18 and 10.7 microns by 0.3, as described in Cardinal et al., U.S. Pat. 3,142,665.

Included in Table II are corresponding properties of control samples, representing a range of HFP-modified TFE resins typical of the prior art.

As with unmodified polytetrafluoroethylene, Table II illustrates that the combination of a hydrocarbon-based and a fluorocarbon-based nucleating agent produces an HFP-modified polytetrafluoroethylene dispersion which produces higher tensile strength tapes, as related to the extrusion pressure required, than when a fluorocarbon nucleating agent alone is used. In general, the melt viscosities of the HFP-modified resins, as measured by tensile creep rate at 380° C., were found to be roughly half those of unmodified TFE resins synthesized under otherwise similar conditions. The reduced viscosity provides a desirable increase in the rate of sintering of the polymers.

To illustrate further the improved performance of the resins made by the process described herein, samples of the resins of Examples 5 and 12, as well as of control resins, were each divided into two parts, one part being baked at 300° C. for 30 minutes in a circulating air oven according to the procedures set forth in U.S. Pat. 3,389,201, issued June 18, 1968, with both parts then being processed into tape according to the standardized procedures hereinbefore described. As can be seen in Table III, the resins of Examples 5 and 12 produced tapes of higher tensile strength, relative to their extrusion pressures, than did the control resins which had been subjected to the same treatment.

TABLE I

| Example No. | Space-time yield, grams/ liter-hr. | Average dispersion particle size, microns | Percent solids in dispersion at shut-down | SSG | Extrusion pressure at 100:1 RR, p.s.i.g. | Tape longitudinal Tensile strength, p.s.i. | Tape longitudinal Elongation, percent |
|---|---|---|---|---|---|---|---|
| 1 | 395 | 0.19 | 36.4 | 2.185 | 1,285 | 1,270 | 265 |
| 2 | 470 | 0.19 | 36.1 | 2.180 | 1,180 | 1,285 | 350 |
| 3 | 495 | 0.20 | 36.6 | 2.188 | 1,150 | 1,173 | 340 |
| 4 | 505 | 0.21 | 35.3 | 2.186 | 1,150 | 1,070 | 350 |
| 5 | 615 | ~0.20 | 36.0 | 2.186 | 1,225 | 1,160 | 355 |
| 6 (comparison) | 615 | ~0.26 | 35.6 | 2.184 | 1,100 | 896 | 315 |
| 7 (comparison) | 325 | 0.195 | 34.5 | 2.191 | 990 | 760 | 300 |
| 8(b) (comparison) | 690 | 0.18 | 35.1 | 2.212 | 950 | 850 | 220 |
| 9 | 790 | 0.20 | 36.7 | 2.206 | 1,150 | 1,120 | 200 |
| Control samples | | 0.20-0.26 | | 2.18-2.23 | 1,000-1,200 | 800-1,000 | 170-240 |

TABLE II

| Example No. | Space-time yield, grams/ liter-hr. | Average dispersion particle size, microns | Percent solids in dispersion at shut-down | SSG | Extrusion pressure at 100:1 RR, p.s.i.g. | Tape longitudinal Tensile strength, p.s.i. | Tape longitudinal Elongation, percent |
|---|---|---|---|---|---|---|---|
| 10 | 215 | ~0.17 | ~36.7 | 2.173 | 1,205 | 1,032 | 220 |
| 11 | 275 | 0.20 | 36.6 | 2.173 | 1,185 | 1,020 | 240 |
| 12 | 235 | 0.20 | 36.7 | 2.176 | 1,185 | 1,034 | 240 |
| 13 (comparison) | 250 | 0.22 | 38.1 | 2.173 | 1,150 | 822 | 290 |
| 14 | 350 | 0.20 | 36.6 | | 1,025 | 920 | 235 |
| 15 | 430 | 0.165 | 34.5 | 2.185 | 1,250 | 1,188 | |
| Control samples | | 0.21-0.26 | | 2.16-2.19 | 800-1,050 | 600-850 | 140-220 |

TABLE III.—EFFECT OF 30-MINUTE PREBAKING TREATMENT AT 300° C.

| | Extrusion pressure at 100:1 R.R., p.s.i.g. | | Tensile properties of tape | | | | | | | |
|---|---|---|---|---|---|---|---|---|---|---|
| | | | Longitudinal direction | | | | Transverse direction | | | |
| | | | Tensile strength, p.s.i. | | Ultimate elongation, percent | | Tensile strength, p.s.i. | | Ultimate elongation, percent | |
| Sample designation | Unbaked | Baked | Unbaked | Baked | Unbaked | Baked | Unbaked | Baked | Unbaked | Baked |
| Product of Example 5 | 1,190 | 2,225 | 1,180 | 1,900 | 310 | 290 | 180 | 400 | 870 | 925 |
| Product of Example 12 | 1,170 | 2,200 | 1,040 | 2,050 | 245 | 200 | 120 | 350 | 480 | 670 |
| TFE homopolymer control (ex. Table I) | 1,100 | 2,125 | 890 | 1,580 | 210 | 200 | 120 | 300 | 610 | 740 |
| HFP-modified polymer control (ex. Table II) | 930 | 2,100 | 720 | 1,610 | 190 | 150 | (¹) | 225 | (¹) | 480 |

¹ Very low.

The ability of the various nucleating agents reported in the foregoing examples, to reduce surface tension, is reported in Table IV.

TABLE IV

| Nucleating agent— | ¹ Dynes/cm. (at 23° C.) |
|---|---|
| Hydrocarbon-based: | |
| "Triton" X-100 | 41 |
| Surfactant DN-65 | >40 |
| "Tergitol" NP-27 | >40 |
| Nucleating agent—Fluorocarbon-based: | |
| C-8 APFC | 47 |
| C-9 AFC | 39 |
| $C_8F_{17}SO_3K$ | 39 |
| AHT ² | 51 |

¹ Approximate surface tension lowering in aqueous solution at a concentration of 1% by weight.
² Ref: Example 7 above and Example III of U.S. Pat. 3,391,099.

It is believed that oxyperfluoroalkyl trifluoroethylenes of 3 to 10 carbon atoms such as n-perfluoropropoxy trifluoroethylene and n-perfluoromethoxy trifluoroethylene can be substituted for the HFP of Examples 10, 11, 14 and 15 in like amount by weight to give products of like characteristics as the products of these examples.

I claim:

1. A process of forming tetrafluoroethylene polymers containing at least 98 percent by weight tetrafluoroethylene comprising charging a reactor with water and tetrafluoroethylene polymerization initiator, maintaining the contents of said reactor at from 50 to 125° C., pressuring said reactor to from 50 to 700 p.s.i. with tetrafluoroethylene and maintaining such pressure; prior to the formation of four percent solids adding as nucleating agents from 0.00002 to 0.002 percent by weight of a hydrocarbon-based nucleating agent and from 0.001 to 0.2 percent by weight of a fluorocarbon-based nucleating agent based on the weight of water present, said nucleating agents having the ability, at a concentration of 1 percent in water at 23° C., to lower surface tension by at least 30 and 20 dynes per centimeter, respectively; then adding to the dispersion from 0.4 to 2.5 percent by weight as based on water of chlorendic acid starting when between four and ten percent by weight as based on the total dispersion of solids have been formed, maintaining the reaction until from 20 to 50 percent by weight as based on total dispersion of solids have been formed, and recovering a tetrafluoroethylene polymer dispersion.

2. The process of claim 1 wherein the tetrafluoroethylene polymer formed contains at least 99% by weight tetrafluoroethylene and the remainder hexafluoropropylene.

3. Process of claim 2 wherein there is added prior to the formation of four percent solids 0.0001 to 0.001 percent by weight hydrocarbon-based nucleating agent and 0.0025 to 0.15 percent by weight fluorocarbon-based nucleating agent.

4. The process of claim 2 wherein the hydrocarbon-based nucleating agent has the formula $$R\text{-}(C_6H_4)_k\text{-}(OCH_2CH_2)_x\text{-}OH$$

wherein

R is a primary, secondary, or tertiary alkyl group of from 1 to 20 carbon atoms;
—$C_6H_4$— is a phenylene group;
k is 0 or 1; and
x is an integer of from 4 to 50;

and the fluorocarbon-based nucleating agent has the formula (1) $\quad Y\text{—}R_f\text{—}Z\text{—}M$ wherein Y is hydrogen, fluorine or chlorine;
$R_f$ is branched or unbranched —$C_nF_{2n}$— wherein n is an integer of from 5 to 10;
Z is $$-\underset{\|}{\overset{O}{C}}-O- \text{ or } -\underset{\underset{O}{\|}}{\overset{O}{\|}}S-O-$$

and

M is alkali metal, ammonium ion, or lower-alkyl substituted ammonium ion; or (2) $\quad R_f'\text{—}O\text{—}\left[\underset{R_f''}{\overset{|}{C}}F\text{—}CF_2\text{—}O\right]_m\text{—}CF\text{—}Z\text{—}M$
$\qquad\qquad\qquad\qquad\qquad\qquad\qquad\qquad\quad |$
$\qquad\qquad\qquad\qquad\qquad\qquad\qquad\qquad R_f''$ wherein $R_f'$ is a prefluoroalkyl group of from 1 to 5 carbon atoms;
$R_f''$ is fluorine or perfluoromethyl;
m is an integer of from 0 to 10;
Z is $$-\underset{\|}{\overset{O}{C}}-O- \text{ or } -\underset{\underset{O}{\|}}{\overset{O}{\|}}S-O-; \text{ and}$$

M is alkali metal, ammonium ion, or lower-alkyl substituted ammonium ions.

5. The process of claim 4 wherein the fluorocarbon based nucleating agent has the formula Y—$R_f$—Z—M.

6. The process of claim 4 wherein the fluorocarbon based nucleating agent has the formula $$R_f'\text{—}O\text{—}\left[\underset{R_f''}{\overset{|}{C}}F\text{—}CF_2O\right]_m\text{—}CF\text{—}Z\text{—}M$$
$$\qquad\qquad\qquad\qquad\qquad\qquad\qquad |$$
$$\qquad\qquad\qquad\qquad\qquad\qquad\qquad R_f''$$

7. The process of claim 5 wherein —Z— is $$-\underset{\|}{\overset{O}{C}}O-$$

8. The process of claim 5 wherein —Z— is $$-\underset{\underset{O}{\|}}{\overset{O}{\|}}S-O-$$

9. The process of claim 5 wherein —M is —$NH_4$.

10. The process of claim 5 wherein —M is an alkali metal.

11. A process according to claim 4 wherein the hydrocarbon-based nucleating agent is $$(CH_3)_3CCH_2C\text{—}(CH_3)_2\text{—}C_6H_4\text{—}(OCH_2CH_2)_x\text{—}OH$$

wherein $x$ has an average value between 9 and 10 and the fluorocarbon-based nucleating agent is ammonium perfluorocaprylate.

12. A process according to claim 4 wherein the hydrocarbon-based nucleating agent is

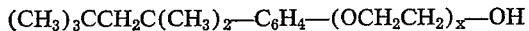
(CH$_3$)$_3$CCH$_2$C(CH$_3$)$_2$—C$_6$H$_4$—(OCH$_2$CH$_2$)$_x$—OH wherein $x$ has an average value between 9 and 10 and the fluorocarbon-based nucleating agent is ammonium-ω-hydrohexadecafluorononanoate.

13. A process according to claim 4 wherein the hydrocarbon-based nucleating agent is a modified ethoxylated straight-chain alcohol and the fluorocarbon-based nucleating agent is ammonium perfluorocaprylate.

14. A process according to claim 4 wherein the hydrocarbon-based nucleating agent is a modified ethoxylated straight-chain alcohol and the fluorocarbon-based nucleating agent is ammounium-ω-hydrohexadecafluorononanoate.

15. The process of claim 11 wherein the hydrocarbon-based nucleating agent is

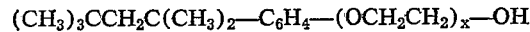
(CH$_3$)$_3$CCH$_2$C(CH$_3$)$_2$—C$_6$H$_4$—(OCH$_2$CH$_2$)$_x$—OH wherein $x$ has an average value between 9 and 10; the fluorocarbon-based nucleating agent is ammonium perfluorocaprylate; the percent by weight of tetrafluoroethylene monomer combined in the polymer is 99.7 to 99.99; and the comonomer is 0.01 to 0.3 percent by weight hexafluoropropylene as determined by infrared measurement.

References Cited

UNITED STATES PATENTS

| | | | |
|---|---|---|---|
| 2,816,082 | 12/1957 | Brinker et al. | 260—92.1 |
| 3,009,892 | 11/1961 | Duddington et al. | 260—92.1 |
| 3,391,099 | 7/1968 | Punderson | 260—92.1 |
| 3,299,019 | 1/1967 | Kealy | 260—87.5 |

JAMES A. SEIDLECK, Primary Examiner

J. A. DONAHUE, Jr., Assistant Examiner

U.S. Cl. X.R.

260—921 R